US007064289B2

(12) United States Patent
Schmidt et al.

(10) Patent No.: US 7,064,289 B2
(45) Date of Patent: Jun. 20, 2006

(54) SHORT-TIME ARC-WELDING SYSTEM AND PROCESS FOR CONTROLLING SUCH A SYSTEM

(75) Inventors: Wolfgang Schmidt, Reiskirchen (DE); Klaus Gisbert Schmitt, Giessen (DE); Jörg Hofmann, deceased, late of Giessen (DE); by Silvia Hofmann, legal representative, Tubingen (DE)

(73) Assignee: Newfrey LLC, Newark, DE (US)

( * ) Notice: Subject to any disclaimer, the term of this patent is extended or adjusted under 35 U.S.C. 154(b) by 38 days.

(21) Appl. No.: 10/771,271

(22) Filed: Feb. 2, 2004

(65) Prior Publication Data

US 2004/0217091 A1 Nov. 4, 2004

Related U.S. Application Data

(63) Continuation of application No. PCT/EP02/08567, filed on Aug. 1, 2002.

(30) Foreign Application Priority Data

Aug. 3, 2001 (DE) ................................. 101 38 959

(51) Int. Cl.
*B23K 9/20* (2006.01)
(52) U.S. Cl. .......................................... 219/99; 219/98
(58) Field of Classification Search .................. 219/98, 219/99
See application file for complete search history.

(56) References Cited

U.S. PATENT DOCUMENTS

| 3,526,744 | A | * | 9/1970 | Ehrlich | ......................... 219/98 |
| 4,241,285 | A | * | 12/1980 | Golonka et al. | .............. 219/98 |
| 4,456,808 | A | * | 6/1984 | Wilkinson et al. | ............ 219/98 |
| 4,804,811 | A | * | 2/1989 | Raycher et al. | ............... 219/98 |

FOREIGN PATENT DOCUMENTS

| DE | 195 32 937 | 11/1996 |
| EP | 0 352 576 | 1/1990 |
| JP | 60009585 | 1/1985 |
| JP | 01143778 | 6/1989 |

OTHER PUBLICATIONS

PCT/EP02/08567, International Search Report, 3 pages, Nov. 26, 2002.

* cited by examiner

*Primary Examiner*—Clifford C. Shaw
(74) *Attorney, Agent, or Firm*—Harness, Dickey & Pierce, P.L.C.

(57) ABSTRACT

The invention relates to a rapid arc welding system (10) for welding elements (12) onto components (14). The inventive system comprises a welding head (16), a supply device (24) for supplying elements (12) to the component (14) and a control and power device (20). Said control and power device comprises a safety circuit for controlling the safety functions of the welding system (10) which allows an operation that is especially safeguarded from unauthorized use of the system in which an operation disruption is partially cancelled. In this partial operation mode, individual components of the system (10) can be activated selectively, especially for the purpose of maintenance.

38 Claims, 3 Drawing Sheets

SHORT-TIME ARC-WELDING SYSTEM AND PROCESS FOR CONTROLLING SUCH A SYSTEM

CROSS-REFERENCE TO RELATED APPLICATIONS

This application is a continuation of PCT/EP02/08567, filed Aug. 1, 2002, which claims priority to German application 101 38 959.0, filed Aug. 3, 2001. The disclosures of the above applications are incorporated herein by reference.

BACKGROUND AND SUMMARY OF THE INVENTION

The present invention relates to a short-time arc welding system for welding elements, such as for example metal studs, on to components, such as for example metal sheets, with:
 a welding head device which has means to move an element in relation to a component,
 a feed unit to feed elements to be welded to the component, and
 a control and energy device, with:
  a power supply device for supplying power to the welding head device;
  a feed control device for controlling the feeding and the movement of an element relative to the component;
  a safety switch for monitoring the safety functions of the welding system, which safety switch permits, in addition to an operating state ON, in which a welding operation or a series of welding operations is rendered possible, at least one further operating state STOP OPERATION, in which the output voltages of the power supply device and of the feed control device are at least blocked.

The invention further relates to a process for controlling such a welding system.

Such a short-time arc welding system and process for short-time arc welding are known generally by the term "stud welding", for example from the brochure "Die neue TUCKER-Technologie. Bolzenschweißen mit System!" ["New TUCKER technology. The stud welding system!"], published by Emhart TUCKER in September 1999.

The technology of stud welding is used in automotive engineering in particular, but not exclusively. Using this technology studs with or without a thread, nuts, eyes and other elements can be welded on to body panels. As a rule, the elements then serve as holding anchors for fastening, for example, interior trim elements to the vehicle body.

In the case of the above-cited stud welding according to TUCKER, initially an element is placed in a welding head. This can take place by means of an automatic feed device, for example by means of compressed air. The welding head then positions the element at the appropriate point on the component. Next a pre-welding current is switched on which flows through the stud and the component. The element is then raised in relation to the component, as a result of which an arc forms. The arc flow is selected such that initially contaminants, surface coatings such as zinc, oil or dry-film lubricants, etc. are burned off. The current then switches to a welding current. As a result of the high welding current the mutually opposing end faces of the element and component melt. The element is then lowered again on to the component so the mutual melts are mixed. The welding current is switched off when the element reaches the component and the arc short-circuits. The melt solidifies and the weld joint is complete. Here the element is raised and lowered in relation to the component in a more recent embodiment by means of an electric motor, in particular by means of a linear motor, which effects a controlled movement of the element.

For power supply and for controlling the welding operation a control and energy device is provided according to the above-mentioned brochure, which device has a power supply device for providing energy to the welding head device, as well as a feed control device for controlling the feeding of elements for welding by means of the feed unit and for controlling the drive of the feed control device for raising and lowering elements. The control and energy device further comprises a safety switch apparatus for monitoring the safety functions of the welding system which permits, in addition to an operating state ON, in which a welding operation or a series of welding operations is rendered possible, at least a further operating state STOP OPERATION, in which the output voltages of the power supply device and of the feed control device are at least blocked. This STOP OPERATION state renders a simplified, fresh start-up of the welding system after switching off possible.

Users of such a welding systems expect maintenance of the system to be as simple as possible for which purpose a fault detection or fault rectification is to be rendered possible in as simple a manner as possible, the ongoing production process being hindered as little as possible. In addition, by its nature such a welding system, which operates with welding currents of several hundred amps and more, must comply with substantial safety requirements.

The object of the invention is therefore to indicate an improved short-time arc welding system or an improved process for controlling such a system, rendering possible simplified maintenance of the system and simplified fault diagnosis, simultaneously complying with a high safety standard. This object is achieved in the case of a short-time arc welding system of the type mentioned at the outset by means which permit the selective activation of individual components of the system in the operating state STOP OPERATION wherein means to secure from selective activation by unauthorized persons are provided.

The object of the invention is further achieved by means of a process for controlling a system of short-time arc welding elements, such as for example metal studs, on to metal components, such as for example metal sheets, in which process the elements are welded to the component by a welding head device being moved in relation to the component by means of an arc with the following steps:
 monitoring the system for a stop command;
 determining whether the stop command is a command for STOP OPERATION only to partially shutdown the system;
 if the stop command is a command for STOP OPERATION, delaying a power supply device for the welding head device and a feed control device for controlling the feeding of elements and controlling the movement of an element relative to the component, and at least subsequently blocking the output voltages of the power supply device and of the feed control device;
 monitoring whether a switch secured from unauthorised actuation emits a switching signal for an operating mode MANUAL OPERATION;
 monitoring whether a permission sensor emits a sampling signal; and
 if the signal for MANUAL OPERATION is received and the sampling signal of the permission sensor is received, enabling certain functions of the welding system with simultaneous blocking of the output voltage of the power supply device.

The object of the invention is achieved entirely in this manner.

According to the invention the selective activation of individual components of the system is now rendered possible, a high safety standard being guaranteed simultaneously by the means for securing from selective activation by unauthorised persons. In any case, even with selective activation of individual functions of the welding system it is also guaranteed that the power supply device cannot deliver any output voltage because such output voltage is either blocked or is disconnected from the mains supply. In this manner it is guaranteed that welding processes cannot be activated in any instance during maintenance or diagnostic work. Maintenance and/or diagnostic work is substantially facilitated because the entire system does not have to be examined in the shutdown state, and individual functions of the welding system can be checked specifically.

In a suitable development of the invention a main switch is provided which is designed as an EMERGENCY STOP switch on activation of which the control and energy device is directly disconnected from the mains supply and is shut down. In this manner the EMERGENCY STOP switch necessitated in any case pursuant to the relevant regulations can simultaneously be used as a main switch by which means the construction is simplified.

According to a further development of the invention, at least the output voltages of the power supply device and of the feed control device are blocked in the operating mode STOP OPERATION, an operating mode selector being provided which is secured from unauthorised use, said selector being coupled to the safety switch in order to facilitate selective activation of individual components of the system in the operating state STOP OPERATION. In this manner a high safety standard is maintained.

In a further development of the invention the power supply device comprises a constant-current source the output voltage of which can be blocked via a pulse blocker switch. In this manner the pulse blocker switch which is normally present in any case in such welding systems, can be used to block the output voltage of the power supply device safely if during partial stop operation for maintenance work individual components of the welding system require selective activation. In addition the pulse blocker switch can be used for specific delay of the welding operation the welding process is to be halted.

In an expedient development of the invention the control and energy device has a control device for controlling the welding system and an input device for inputting operating commands.

In further advantageous development of the invention, the welding head device can be coupled with an external operator control via which a welding operation can be activated in the operating state ON. In this manner the welding head device can sensibly be integrated into the external control of a production process.

In a further advantageous development of the invention the control and energy device has a customer interface which can be coupled with the external operator control preferably via a bus. The coupling of the control and energy device to an external control system is hereby rendered possible in a particularly simple manner.

According to a further development of the invention, the operating mode selector permits switching between the operating modes AUTOMATIC, wherein the welding operation can be activated via external operator control in the operating state ON, and MANUAL OPERATION wherein at least the output voltage of the power supply device is blocked.

Here preferably the operating mode selector is coupled with a permission sensor which allows activation of selected functions of the welding system in the operating mode MANUAL OPERATION on manual activation and simultaneous actuation of the external operator control in two-hand operation.

As a result of these measures it is guaranteed that activation of certain functions of the welding system is only possible in two-hand operation, because to activate an operation the user has to actuate the permission sensor with one hand and has to grip the external operator control with the other hand. In this manner high safety is guaranteed from manual contact with the welding head or the feed device with partial cancellation of the STOP OPERATION, the permission sensor in the operating mode MANUAL OPERATION being capable, for example, of feeding elements by means of the feed unit and activating a drive for the welding head device to raise and lower elements. These are the most important diagnostic tasks which can be permitted in the case of faults without impairment of safety.

According to a further development of the invention, the safety switch apparatus has a further operating state OPERATOR'S SAFETY on activation of which the power supply device and the feed control device are delayed and disconnected from the mains supply, while the control device and input device remain on protective low voltage and the customer interface is supplied with voltage, a manual cancellation of the operating state OPERATOR'S SAFETY leading to resumption of the operating state ON after a time delay. By means of this measure the control and energy device can be shut down safely in the event of a necessary halt without causing complications in an ongoing welding process, for example if a user opens a door of the control and energy device, while simultaneously a simplified, new start-up is possible.

In a corresponding manner preferably in the operating state STOP OPERATION the output voltage of the power supply device is blocked and the feed control device is delayed and disconnected from the mains supply, the control device and input device remaining on protective low voltage and the customer interface being supplied with power, a manual cancellation of the state STOP OPERATION immediately leading to resumption of the operating state ON. The operating state STOP OPERATION thus essentially corresponds to the operating state OPERATOR'S SAFETY, but with reduced effect, because the power supply device is not disconnected from the mains supply rather the output voltage thereof is only blocked, whereupon after manual cancellation of the STOP OPERATION state the standby state is immediately resumed.

In an advantageous development of the invention the safety switch has connections for coupling to an external control system, for example to the external operator control for transmitting safety functions. Here the connections are preferably designed with safe technology with one or more channels or are designed as a bus and are preferably designed for the transmission and monitoring of commands for STOP OPERATION and OPERATOR'S SAFETY.

In this manner safety functions can be transmitted with safe technology in the case of the external operator control or an external control system into which the external operator control is integrated, wherein for example an external EMERGENCY STOP request leads only to the state OPERATOR'S SAFETY in the case of the control and energy device. The safety switch is designed with safe technology in a preferred development of the invention. In this manner an extremely high safety standard is guaranteed in respect of the hardware.

It is understood that the features cited hereinbefore and those features to be described hereinafter can be used not only in the combination indicated but also in other combinations or in isolation, without going beyond the scope of the invention.

BRIEF DESCRIPTION OF THE DRAWINGS

Further features and advantages of the invention emerge from the following description of a preferred practical example with reference to the drawings, in which.

DETAILED DESCRIPTION

Figure 1:
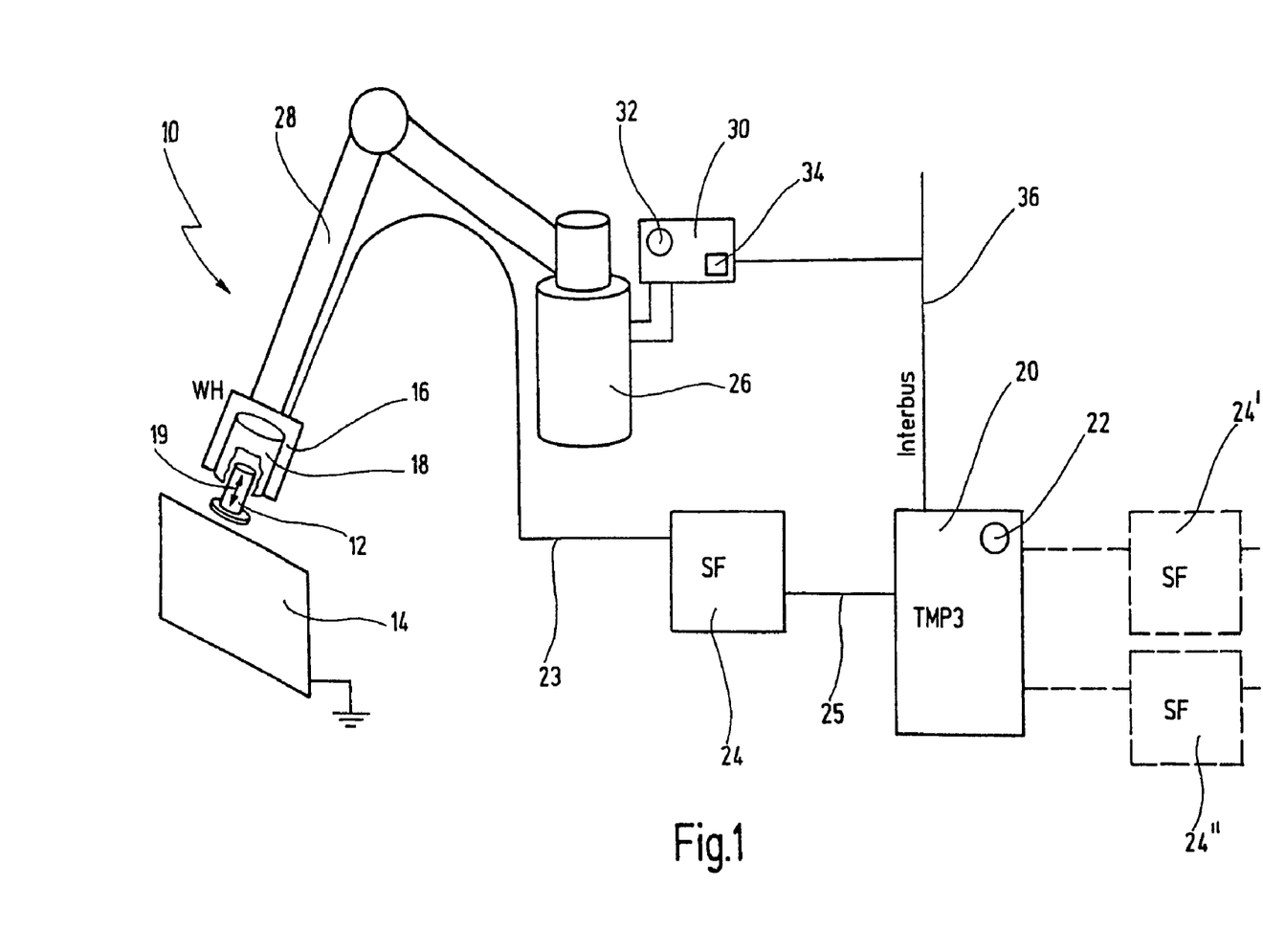
FIG. 1 is a view of a welding system according to the invention in extremely simplified schematic representation.

In FIG. 1 a welding system according to the invention is sketched extremely schematically and is designated as a whole by the number 10. The welding system 10 has a welding head device 16 by means of which elements 12, in the present case studs, can be welded to a component which is indicated diagrammatically by the number 14. As represented in FIG. 1, the welding head 16 can, but does not have to, be accommodated on a robot arm 28 of a robot 26. Accommodation on the robot arm 28 makes it possible to position the welding head 16 automatically in relation to the component 14, which is appropriate in particular in automated production plant. For the energy supply and for controlling the welding head device 16 a control and energy device 20 is provided which is also designated TMP3. The control and energy device 20 is connected via a line 25 to a feed unit 24, via which the elements 12 to be welded are fed via a line 23, for example by means of compressed air, to the welding head device 16. It is understood that although the lines 25 and 23 are only represented by one line, these lines can represent energy supply lines, control lines, fluid lines and such like, but for the sake of simplicity are only represented by a single line.

The robot 26 has an external operator control 30 which can form part of a control apparatus for an automated production plant and is coupled to the control and energy device 20, preferably via an industrial bus 36, for example of the Interbus type.

Further feed units can be connected to the control and energy device 20, as indicated by numbers 24', 24", which in turn are coupled to further welding head devices (not shown).

The welding head device 16 has a drive designed as a linear motor, which is indicated only diagrammatically in FIG. 1 by the number 18. By means of the drive 18 an element 12, for example a stud, is raised and lowered during a welding operation in relation to the component 14, as is indicated by the double arrow 19.

The control and energy device 20 has a main switch 22 which is an EMERGENCY STOP switch in design and is marked in red/yellow. This switch 22 is designed according to EN 292-2 number 6.6.66, and corresponds in its functional design to the European standard EN 418.

The external operator control 30 of the robot 26 also has a suitable EMERGENCY STOP switch 32.

Figure 2:
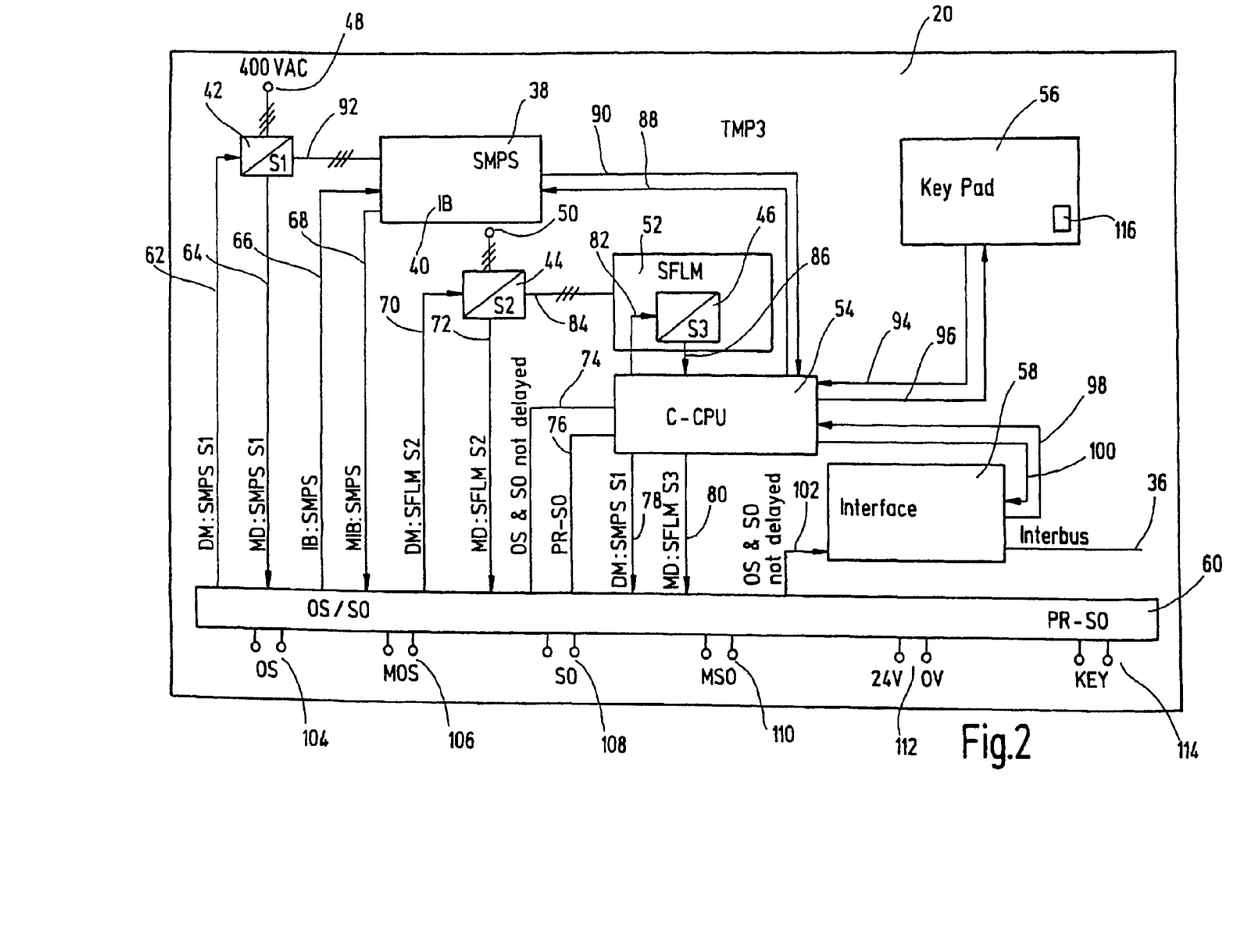
FIG. 2 is a block diagram of the control and energy device for a welding system according to the invention.

The more detailed structure of the control and energy device 20 can be seen from the block diagram according to FIG. 2. The control and energy device 20 has a power supply device 38 which is designated SMPS. This power supply device 38 contains a constant-current source which can provide the necessary high currents (of up to 1,500 A) for the welding head device 16 and the output of which can be blocked via a pulse blocker switch 40, which is also abbreviated to IB. To control the feeding of elements by means of the feed unit 24 to the welding head device 16 and to control the linear motor drive 18 of the welding head device 16, a feed control device 52 is provided, which is also abbreviated to SFLM.

The control and energy device 20 furthermore has a central control device 54 designated C-CPU in FIG. 2. The central control device 54 coordinates and monitors the individual components of the control and energy device 20. For operating the control and energy device 20 an input device 56, which in FIG. 2 is designated the key pad, is coupled via lines 94, 96 to the central control device 54. The control and energy device 20 furthermore has a customer interface 58 which is referred to as the interface in FIG. 2, and is coupled via lines 98, 100 to the central control device 54. The customer interface 58 is coupled to a bus 36 which is preferably an industrial bus, in the nature of the Interbus.

The power supply device 38 receives its voltage via a multi-polar line 92 from the contactor S1, which is designated by the number 42. The contactor S1 is connected to the output from the main switch 22 via a connection 48, not shown in FIG. 2. The feed control device SFLM 52 is supplied with voltage by a contactor S2, designated by the number 44, via a multi-polar line 84. The contactor S2 is also connected to the output from the main switch 22 via a connection 50.

Because a plurality of feed units SF may be connected to the control and energy device 20, each feed unit SF additionally has a contactor 46 or S3 via which the voltage supply of 24 volts received from the feed control device SFLM S2 can be switched off. The feed control device 52 is connected for this purpose via lines 82, 86 respectively to the central control device C-CPU 54.

In order to monitor and control fully the safety functions of the control and energy device 20, a safety switch 60 is provided which can be designed as a separate plug-in unit or a separate circuit card. This safety switch 60 is designed with safe technology and is connected to the individual modules of the control and energy device 20 via control lines and control test lines, as explained in more detail hereinafter. In addition, the safety switch 60 has a plurality of connections to the hardware monitoring and control of external safety functions, as is also explained hereinafter.

In the context of this application, "safe technology" is intended to denote a classification into the category four according to the European standards EN 954 and EN 60204 respectively. The safety switch 60 serves to monitor and control diverse operating states of the control and energy device 20.

A first operating state, referred to as ON, means that the control and energy device is ready for a welding operation which can be activated via the external operator control 30 via the bus 36.

A further operating state, referred to hereinafter as OPERATOR'S SAFETY or OS, means that the power supply device 38 is delayed via the pulse blocker switch 40 and is then disconnected from the mains supply via the contactor S1. Further the feed control device SFLM 52 is delayed and disconnected from the mains supply via the contactor S2. Simultaneously the power supply of 24 volts for the various feed units 24 is switched off via the contactor S3. In this state the central control device 54 C-CPU and the input device 56 remain on protective low voltage while in addition the customer interface 58 continues to be supplied with current by the user. An independent start-up from this state is not possible. After cancelling the operating state OPERATOR'S SAFETY by means of a corresponding reset signal, which can be input via the input device 56, the contactors S1, S2, S3 are switched on again and the control and energy device 20 again passes into the operating state ON with a time delay which preferably can be about 30 seconds.

A further operating state which hereinafter is referred to as STOP OPERATION or SO corresponds to the normal shutdown of the operator's safety state, but with reduced effect, wherein the power supply device 38 is delayed and safely shut down by means of the pulse block 40. The feed control device SFLM 52 is delayed and disconnected from the mains supply via the contactor S2, while simultaneously the contactor S3 is triggered for supplying power to the feed units SF. The central control device C-CPU 54 and the input device 56 remain on protective low voltage, while the customer interface 58 continues to be supplied with current by the user externally. Independent start-up from this state is not possible.

After canceling the state STOP OPERATION, for example via a reset signal which is input via the input device 56, the contactors S2, S3 are closed again and the power supply device 38 enabled again via the pulse blocker switch 40 so that the control and energy device is again ready for operation in the state ON. Additionally there is the possibility of partially resetting the state STOP OPERATION, as indicated in FIG. 2 by the indication PR-SO ("partial reset—stop operation"). To do this an operating mode selector 116 secured from unauthorised use, which can be a key-operated switch in design, must be activated. Via a permission sensor 34, which can be located according to FIG. 1 for example on an external operator control 30, certain functions of the welding system can then be actuated for maintenance and diagnostic purposes, as is explained hereinafter in still greater detail by reference to FIG. 3.

The safety switch 60 is connected via a control line 62 to the contactor S1 via which isolation of the contactor S1 can be effected, which is indicated by DM:SMPS S1, wherein DM is used to denote "disconnect from mains". Via a line 64 the safety switch 60 monitors whether a command to trigger the contactor S1 output via the line 62 has been executed, which is indicated by MD:SMPS S1, the indication "MD" standing for "monitor disconnection".

The safety switch 60 can activate the pulse blocker switch 40 via a line 66 in order to delay the power supply device SMPS 38 or to block the output voltage completely, which is indicated by IB:SMPS. The block is monitored via the line 68 by the pulse blocker switch 40 (MIB:SMPS).

The contactor S2 can be triggered by the safety switch 60 via a line 70, this being indicated by DM:SFLM S2. The isolation of the contactor from the safety switch 60 is monitored via the line 72 (MD:SFLM S2).

The power supply device SMPS communicates with the central control device C-CPU via two lines 88, 90. The central control device C-CPU communicates with the feed control device SFLM via two lines 82, 86.

The safety switch 60 furthermore sends a non-delayed control signal to the central control device C-CPU via a line 74 in case the states OPERATOR'S SAFETY and STOP OPERATION have been activated (OS & SO not delayed), in order to block the receipt of further control signals and to bring to a defined end any welding processes that have been started. The safety switch 60 further gives a control signal to the central control device C-CPU via a line 76 in case a partial cancellation of the stop operation in the state STOP OPERATION is to take place (PR-SO).

The central control device C-CPU can send a command to disconnect S1 to the safety switch 60 via a line 78 (DM: SMPS S1) in order to block SMPS 38 immediately in the event of excessive voltages in the welding circuit and to disconnect immediately from the mains. Furthermore the safety switch 60 receives an acknowledgement via a line 80 on whether the contactor S3 was disconnected (MD:SFLM S3).

The safety switch 60 furthermore passes on a non-delayed message to the customer interface 58 via a line 102 that the operating states OPERATOR'S SAFETY or STOP OPERATION have been activated.

The safety switch 60 can further be coupled in terms of hardware via four two-channel connections 104, 106, 108, 110 to the external operator control 30 or to an external production control, in order to be able to exchange commands and acknowledgements regarding the states OPERATOR'S SAFETY OS and STOP OPERATION SO. An external request for an immediate shutdown of the welding system 10 to the inputs 104, which, for example, can be made from an EMERGENCY STOP switch 32 of the external operator control 30, does not lead to a complete shutdown of the control and energy device TMP3, but only to an immediate request for the operating state OPERATOR'S SAFETY OS. In this manner on receipt of an external EMERGENCY STOP signal the control and energy device 20 can be delayed and shut down in a defined manner so subsequently a rapid new start-up of the control and energy device 20 is possible. A correct execution of the external command for the operating state OPERATOR'S SAFETY is emitted by the safety switch 60 via the two connections MOS 106.

In a corresponding manner an external command to reach the operating state STOP OPERATION SO can be passed on via the two connections 108 to the safety switch 60 which reports the correct execution via the two connections MSO 110.

The safety switch 60 further receives two more connections 112 to connect an operating voltage of 24 volts, and two connections 114 to connect the operating mode selector 116, which selector, for example, can be integrated into the input device 56, or can be provided at another point.

The operating mode selector 116 is for example designed as a key-operated switch and allows switching between the operating modes AUTOMATIC and MANUAL OPERATION. By means of the operating mode selector 116 the central control device C-CPU 54 is notified that the state STOP OPERATION has been partially cancelled and that in the event of simultaneous actuation of the permission sensor 34, which, for example, can be integrated into the external operator control 30 of the robot 26, certain functions are permitted during the actuation of the permission sensor.

Figure 3:
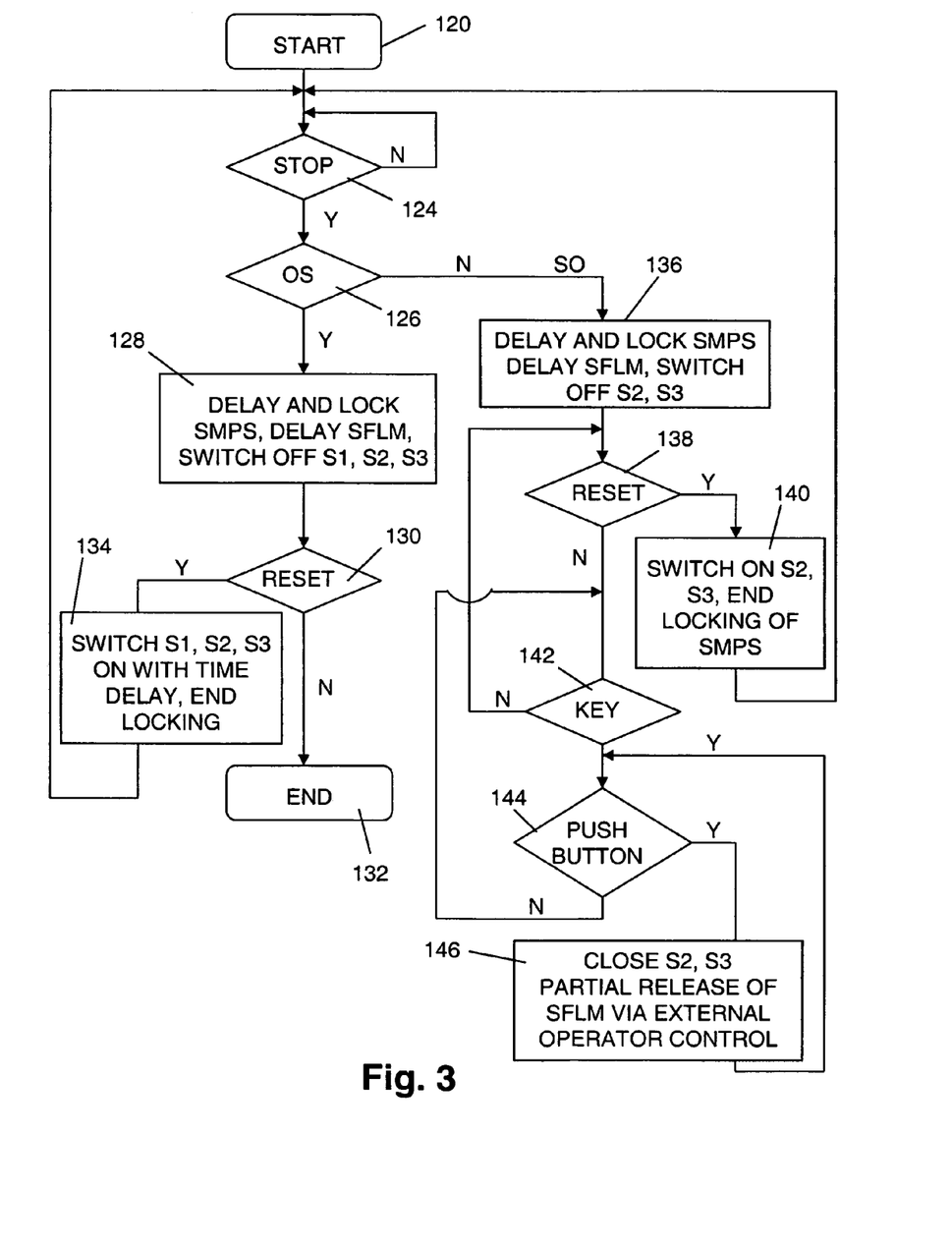
FIG. 3 is a flow chart to clarify the safety functions in the various operating states.

Referring to FIG. 3 the various stop functions and the partial cancellation of the state STOP OPERATION are described below in more detail. Starting from the state ON at the starting window 120 the system monitors whether a stop command 124 is emitted, and if such command is emitted, it also monitors whether it is a command for a complete shutdown, i.e. for OPERATOR'S SAFETY, or not, as is indicated by number 126. In the case of the request for the state OPERATOR'S SAFETY, the power supply device SMPS is delayed, blocked via the pulse blocker switch IB and disconnected from the mains by S1. Further the feed control device SFLM is delayed and the contactors S2, S3 triggered, as indicated by the block 128. Independent start-up in this state is impossible. Now it is monitored whether the OPERATOR'S SAFETY is to be cancelled, as through the query 130 is indicated whether a reset signal is received or not. If there is no reset signal, the end 132 is reached. In the case of a reset signal, the contactors S1, S3, S3 are switched on and the pulse blockade is cancelled. The system is again ready for operation after a time delay, as is indicated by the block 134.

If at the branching 126 it is determined that the stop command is not a request for OPERATOR'S SAFETY OS, then it is a request for STOP OPERATION SO. In this case, as indicated by the block 136, SMPS is delayed via the pulse blocker switch IB and shut down safely. Simultaneously SFLM is delayed and disconnected from the mains supply via S2, S3.

From this state no independent restart is possible. In the case of a reset command 138, which for example can be input via the input device 56, the contactors S2, S3 are closed again mechanically and the blocking of the power supply device 38 SMPS cancelled, so the system is again ready for operation in the state ON. If there is no reset command, monitoring continues at 142 as to whether the operating mode selector 116 has been actuated in order to set the operating mode MANUAL OPERATION. If this is the case, monitoring continues at 144 as to whether the permission sensor 34 is permanently actuated. If this is the case, S2, S3 are closed again and the feed control device SFLM is partially enabled, as is indicated by the block 146. In the case of this partial enabling the functions drive (cradle) forwards/backwards and feed elements (studs) can be executed via the external operator control 30, which functions are transmitted via the customer interface 58 via bus 36. Because of the necessary simultaneous actuation of the permission sensor 34 and the external operator control 30, this is only possible by means of two-hand operation, so there is sufficient accident protection for the operator. The power supply device 38 in any case remains safely blocked in this state via the pulse blocker switch IB 40 so no welding processes can be activated. If the operating mode selector 116 is reset to AUTOMATIC, the state stop operation can be ended again via a reset signal, cf. 138, 140.

In addition, a further operating state WORKSHOP can be provided which, however, is designed purely in terms of software, and is not designed with safe technology. Apart from the EMERGENCY STOP switch, the function WORKSHOP is not integrated into the safety concept of the control and energy device 20. The function WORKSHOP may only be executed by persons specially trained for this function in zones identified separately for this function. In this operating state various maintenance or diagnostics functions can be executed via an operator unit connected to a feed unit SF.

The permission sensor 34 and the feed control device SFLM 52 also are designed based on the risk assessment S1F1P2 for partially cancelled stop operation with safe technology according to category four.

Captions for FIG. 3 are as follows:
J=yes
N=no
ende=end
Taster=key

128=Delay and block SMPS, delay SFLM, switch off S1, S2, S3
134=Switch on S1, S2m S3 with time delay, cancel blocking
136=Delay and block SMPS, delay SFLM, switch off S2, S3
140=Switch on S2, S3, cancel SMPS blocking
146=Close S2, S3
Partially release SFLM via external operating point.

What is claimed is:

1. A short-time arc welding system operable to weld an element to a component, the system comprising:
    a welding head device having a drive device operable to move the element in relation to the component;
    a control and energy device having a plurality of members, including:
        a power supply device operable to supply an electrical power to the welding head device;
        a feed control device operable to control both an element feed and a movement of an individual element relative to the component;
        a central control device operable to coordinate and monitor the members of the control and energy device; and
        a safety switch independent of the central control device having a first plurality of control lines and a second plurality of test lines, the safety switch directly connected via individual ones of the plurality of control lines to each of the power supply device, the feed control device and the central control device, the safety switch operable to monitor a plurality of safety functions of the welding system;
    wherein the safety switch defines a first operating state operable to enable at least one welding operation, and at least a second operating state.

2. The system of claim 1, comprising:
    one of a sensor device and a selection device which in the second operating state is operable to permit a selective activation of a plurality of individual components of the system;
    wherein an output voltage of the power supply device is operatively blocked in the second operating state.

3. The system of claim 2, wherein the selection device is operable to secure from the selective activation by an unauthorized person.

4. The system of claim 1, wherein the first operating state corresponds to an ON mode having the at least one welding operation provided as one of a single welding operation and as a series of welding operations.

5. The system of claim 4, wherein the second operating state corresponds to a STOP OPERATION mode, wherein at least the output voltage of the power supply device and an output voltage of the feed control device are operably blocked.

6. The welding system of claim 5, comprising an operating mode selector securable from an unauthorised use and operably coupled to the safety switch wherein in the operating mode STOP OPERATION a selective activation of individual components of the system is enabled.

7. The welding system of claim 4, comprising:
    an external operator control; and
    a welding operation activated in the ON mode wherein the welding head device is operably coupled to the external operator control.

8. The welding system of claim 7, comprising:
    a third operating state corresponding to an operating mode AUTOMATIC;

a fourth operating state corresponding to an operating mode MANUAL OPERATION, in which at least the output voltage of the power supply device is operably blocked; and a switching action of the operating, mode selector wherein the operating mode selector operably switches between the operating mode AUTOMATIC, in which a welding operation is activated via the external operator control in the operating state ON, and the operating mode MANUAL OPERATION, in which at least the output voltage of the power supply device is operably blocked.

9. The welding system of claim 8, comprising:
a manual operation defined by the operating mode MANUAL OPERATION; and
a permission sensor which in the operating mode MANUAL OPERATION during a manual activation and simultaneous actuation of the external operator operably controls the manual operation to permit activation of selected functions of the welding system.

10. The system of claim 9, comprising a feed unit operable to feed the element to the welding head device for welding.

11. The welding system of claim 10, comprising:
a drive of the welding head device operable to one of raise and lower the element;
wherein the permission sensor in the operating mode MANUAL OPERATION operably permits a feeding of the element via the feed unit and activation of the drive.

12. The welding system of claim 7, comprising:
a customer interface connected to the control and energy device; and
a bus operably coupling the external operator control to the customer interface.

13. The welding system of claim 4, comprising:
a protective low voltage operatively provided to the control device and the input device;
wherein in the operating mode STOP OPERATION the output voltage of the power supply device is operably blocked and the output voltage of the feed control device is sequentially delayed and disconnected from the electrical power, the control device and the input device operably remaining on the protective low voltage and the customer interface operatively supplied with a voltage; and
wherein a manual cancellation of the operating mode STOP OPERATION immediately leads to a resumption of the operating mode ON.

14. The welding system of claim 1, comprising:
a constant-current source within the power supply device;
an output voltage of the constant-current source; and
a pulse blocker switch operable to block the output voltage of the constant current source.

15. The welding system of claim 1, wherein the control and energy device comprises:
a control device operable to control the welding system; and
an input device operable to input a plurality of operating commands.

16. The welding system of claim 15, comprising:
a fifth operating state corresponding to an operating mode OPERATOR'S SAFETY of the safety switch; and
a delay signal created by the safety switch;
wherein on activation of the operating mode OPERATOR'S SAFETY the power supply device and the feed control device are operably delayed by the delay signal and disconnected from the electrical power in a defined manner, while the control device and the input device remain on a protective low voltage and the customer interface is operatively supplied with a voltage; and
wherein a manual cancellation of the operating mode OPERATOR'S SAFETY operably leads to a resumption of the operating mode ON following a time delay.

17. The welding system of claim 16, comprising:
an external control system operatively connected to the control and energy device;
an external operator control of the external control system; and
a plurality of connections of the safety switch;
wherein the plurality of connections of the safety switch operatively couple the safety switch to the external operator control.

18. The welding system of claim 17, wherein the connections operatively meet a safe technology design for both transmission and monitoring of at least a command for each of the operating mode STOP OPERATION and the operating mode OPERATOR'S SAFETY.

19. The welding system of claim 1, wherein the safety switch operably meets a safe technology design.

20. A short-time arc welding system operable to weld an element to a component, the system comprising:
a welding head device having a drive device operable to move the element in relation to the component;
a control and energy device, including a power supply device operable to supply an electrical power to the welding head device;
a feed control device operable to control both an element feed and a movement of an individual element relative to the component;
a control device operable to control the welding system; and
a safety switch operable to monitor a plurality of safety functions of the welding system, the safety switch having a signal output operable to initially delay an output of the power supply device and subseguently disconnect the power supply device;
wherein the safety switch defines a first operating state operable to enable at least one welding operation, a second operating state having an output voltage of the power supply device operatively blocked, and a third operating state.

21. The system of claim 20, comprising:
a selection device operable in the second operating state to enable a selective activation of a plurality of individual components of the system;
wherein the selection device is operable to secure from the selective activation by an unauthorized person.

22. The system of claim 20, comprising an input device operable to input a plurality of operating commands.

23. The system of claim 20, comprising a feed unit operable to feed the element to the welding head device.

24. The welding system of claim 20, comprising:
an external control system operatively connected to the control and energy device;
an external operator control of the external control system; and
a plurality of connections of the safety switch;
wherein the plurality of connections of the safety switch operatively couple the safety switch to the external operator control.

25. The welding system of claim 24, comprising:
the third operating state defining a manual welding operation; and a permission sensor simultaneously operable with the external operator control to operably control the manual welding operation.

26. A method to control a short-time arc welding system operable to weld an element to a component using electrical power from a control and energy device connected to a drive device, in turn coupled to a welding head, the method comprising:
   moving the element in relation to the component using the drive device;
   supplying an electrical power to the welding head device from a power supply device of the control and energy device;
   controlling both an element feed and a movement of an individual element relative to the component using a feed control device;
   coordinating the arc welding system using a central control device;
   connecting a safety switch independently to each of the power supply device, the feed control device and the central control device, the safety switch operable to send a delaying signal to the power supply device;
   monitoring a plurality of safety functions of the welding system using the safety switch; and
   initiating a first operating state operable to enable at least one welding operation and at least one second operating state using the safety switch.

27. The method of claim 26, comprising
   selectively activating a plurality of individual components of the system using one of a sensor device and a selection device in the second operating state; and
   blocking an output voltage of the power supply device in the second operating state by one of the sensor device and the selection device.

28. The method of claim 26, comprising enabling the at least one welding operation as one of a single welding operation and as a series of welding operations in the first operating state, corresponding to an ON mode.

29. The method of claim 26, comprising blocking at least the output voltage of the power supply device and an output voltage of the feed control device in the second operating state corresponding to a STOP OPERATION mode.

30. The method of claim 29, comprising:
   coupling an operating mode selector securable from an unauthorised use to the safety switch;
   enabling a selective activation of individual components of the system in the operating mode STOP OPERATION using the safety switch; and
   blocking at least the output voltage of the power supply device and the output voltage of the feed control device in the operating mode STOP OPERATION.

31. The method of claim 26, comprising
   enabling a third operating state corresponding to an operating mode AUTOMATIC; and
   blocking at least the output voltage of the power supply device in a fourth operating state corresponding to an operating mode MANUAL OPERATION.

32. The method of claim 31, comprising:
   activating a welding operation via an external operator control in the ON mode;
   blocking at least the output voltage of the power supply device; and
   switching between the operating mode AUTOMATIC and the operating mode MANUAL OPERATION using a switching action of an operating mode selector.

33. A method for controlling a system to weld a short-time arc welding element, including a metal stud, onto a component, including a metal sheet, using a welding head device operatively moved in relation to the component along an arc, the method comprising:
   monitoring the system for a stop command;
   determining if the stop command is a STOP OPERATION command, operable to partially shut down the system; and
   performing the following steps, if the stop command is the STOP OPERATION command:
      delaying both a power supply device for the welding head device and a feed control device operable to control a feeding of the element;
      controlling a movement of the element relative to the component; and
      at least subsequently blocking an output voltage of both the power supply device and the feed control device.

34. The method of claim 33, comprising monitoring if a switch securable from an unauthorised actuation emits a switching signal for an operating mode MANUAL OPERATION.

35. The method of claim 34, comprising monitoring if a permission sensor emits a sampling signal.

36. The method of claim 35, comprising:
   enabling a plurality of predetermined functions of the welding system; and
   simultaneously blocking the output voltage of the power supply device if both the switching signal for the operating mode MANUAL OPERATION is received and the sampling signal of the permission sensor are received.

37. A process for controlling a system to weld a short-time arc welding element, including a metal stud, onto a component, including a metal sheet, wherein the element is welded to the component by a welding head device being moved in relation to the component along an arc, the method comprising:
   monitoring the system for a stop command;
   determining if the stop command is a STOP OPERATION command, operable to partially shut down the system;
   if the stop command is the STOP OPERATION command:
      delaying both a power supply device for the welding head device and a feed control device operable to control a feeding of the element;
      controlling a movement of the element relative to the component; and
      blocking at least an output voltage of both the power supply device and the feed control device;
   monitoring if a switch securable from an unauthorised actuation emits a switching signal for an operating mode MANUAL OPERATION;
   identifying if a permission sensor emits a sampling signal;
   simultaneously blocking the output voltage of the power supply device if both the switching signal for the operating mode MANUAL OPERATION is received and the sampling signal of the permission sensor is received.

38. The process of claim 37, comprising enabling a plurality of predetermined functions of the welding system.

* * * * *